(12) United States Patent
Tomalin

(10) Patent No.: US 11,091,820 B2
(45) Date of Patent: Aug. 17, 2021

(54) ALLOY COATED EDM WIRE

(71) Applicant: THERMOCOMPACT, Epagny Metz-Tessy (FR)

(72) Inventor: Dandridge Tomalin, Mason, OH (US)

(73) Assignee: THERMOCOMPACT, Epagny Metz-Tessy (FR)

( * ) Notice: Subject to any disclaimer, the term of this patent is extended or adjusted under 35 U.S.C. 154(b) by 121 days.

(21) Appl. No.: 16/340,417

(22) PCT Filed: Oct. 6, 2017

(86) PCT No.: PCT/US2017/055465
§ 371 (c)(1),
(2) Date: Apr. 9, 2019

(87) PCT Pub. No.: WO2018/071284
PCT Pub. Date: Apr. 19, 2018

(65) Prior Publication Data
US 2019/0233919 A1    Aug. 1, 2019

Related U.S. Application Data

(60) Provisional application No. 62/408,275, filed on Oct. 14, 2016.

(51) Int. Cl.
*C22C 9/04* (2006.01)
*C23C 8/10* (2006.01)
(Continued)

(52) U.S. Cl.
CPC ............... *C22C 9/04* (2013.01); *B23H 7/08* (2013.01); *B23K 35/02* (2013.01);
(Continued)

(58) Field of Classification Search
CPC .... B23H 7/08; C22C 9/04; C22C 9/00; C22F 1/08; C23C 10/28; C23C 12/02;
(Continued)

(56) References Cited

U.S. PATENT DOCUMENTS

| 4,055,445 A | 10/1977 | Pops | |
| 4,341,939 A * | 7/1982 | Briffod | B23H 7/08 |
| | | | 219/69.12 |

(Continued)

FOREIGN PATENT DOCUMENTS

| CN | 101537519 A | 9/2009 |
| CN | 105312698 A | 2/2016 |

(Continued)

OTHER PUBLICATIONS

Maher, I. et al. "Review of improvements in wire electrode properties for longer working time and utilization in wire EDM machining." 2015. International Journal of Advanced Manufacturing Technology. 75. p. 329-351. (Year: 2015).*

*Primary Examiner* — Nicholas A Wang
(74) *Attorney, Agent, or Firm* — William H. Eilberg

(57) ABSTRACT

An electrode wire for use in an electrical discharge machining apparatus includes a metallic core and a layer of gamma phase brass disposed over the metallic core. Particles of beta phase brass are interspersed within the gamma phase brass layer. An oxide layer including zinc is disposed over the gamma phase brass layer.

8 Claims, 10 Drawing Sheets

(51) Int. Cl.
  *C23C 10/28* (2006.01)
  *C23C 12/02* (2006.01)
  *C25D 5/50* (2006.01)
  *C25D 7/06* (2006.01)
  *C23C 28/00* (2006.01)
  *B23H 7/08* (2006.01)
  *B23K 35/28* (2006.01)
  *C22F 1/08* (2006.01)
  *C25D 5/48* (2006.01)
  *B23K 35/02* (2006.01)
  *B23K 35/40* (2006.01)
  *B23K 35/30* (2006.01)
  *C22C 9/00* (2006.01)

(52) U.S. Cl.
  CPC ...... *B23K 35/0216* (2013.01); *B23K 35/0272* (2013.01); *B23K 35/282* (2013.01); *B23K 35/30* (2013.01); *B23K 35/302* (2013.01); *B23K 35/40* (2013.01); *C22F 1/08* (2013.01); *C23C 8/10* (2013.01); *C23C 10/28* (2013.01); *C23C 12/02* (2013.01); *C23C 28/321* (2013.01); *C23C 28/345* (2013.01); *C25D 5/48* (2013.01); *C25D 5/50* (2013.01); *C25D 7/0607* (2013.01); *C22C 9/00* (2013.01)

(58) Field of Classification Search
  CPC ....... C23C 28/321; C23C 28/345; C23C 8/10; C25D 5/48; C25D 5/50; C25D 7/0607
  See application file for complete search history.

(56) References Cited

U.S. PATENT DOCUMENTS

| | | |
|---|---|---|
| 4,686,153 A | 8/1987 | Tominaga et al. |
| 4,977,303 A | 12/1990 | Briffod |
| 5,762,726 A | 6/1998 | Barthel |
| 6,781,081 B2 | 8/2004 | Groos et al. |
| 7,723,635 B2 | 5/2010 | Shin |
| 8,067,689 B2 | 11/2011 | Tomalin |
| 8,378,247 B2 | 2/2013 | Blanc et al. |
| 8,853,587 B2 | 10/2014 | Baumann et al. |
| 10,583,509 B2 * | 3/2020 | Weber ........................ C22C 9/04 |
| 2008/0061038 A1 * | 3/2008 | Blanc ........................ B23H 7/08 219/69.12 |
| 2011/0290531 A1 * | 12/2011 | Baumann ................ B23H 7/08 174/126.2 |
| 2015/0027991 A1 | 1/2015 | Weber |
| 2016/0039027 A1 | 2/2016 | Yen |

FOREIGN PATENT DOCUMENTS

| | | |
|---|---|---|
| FR | 501547 | 4/1920 |
| WO | 2005074396 A2 | 8/2005 |

* cited by examiner

ALLOY COATED EDM WIRE

RELATED APPLICATIONS

This application claims priority to International Appln. No. PCT/US2017/055465, filed Oct. 6, 2017 and U.S. Provisional Appln. No. 62/408,275, filed Oct. 14, 2016, the entirety of which are incorporated herein by reference.

TECHNICAL FIELD

The present invention relates to electrode wires used for fabricating metal or electrically conducting parts by electrical discharge machining (EDM) using an EDM machine tool, and specifically to a process for manufacturing high performance EDM electrode wire utilizing gamma phase brass coatings and an EDM wire produced from the process.

BACKGROUND

Since the identification of a commercially feasible gamma (γ) phase brass coated EDM wire electrode construction in U.S. Pat. No. 5,945,010 more than twenty years ago, the high performance EDM wire market has been dominated by γ-brass alloy coated EDM wire constructions. The γ-brass alloy coatings have been applied to a wide variety of unalloyed, alloyed, single, and/or multi-layered composite copper bearing cores. They are typically formed by a diffusion anneal process, which was first introduced to the EDM application by Tominaga (U.S. Pat. No. 4,686,153) on a copper clad steel core and followed by Brifford (U.S. Pat. No. 4,977,303) on a copper core.

In a diffusion anneal process unalloyed zinc is applied by either electrolytic deposition or a dip forming process followed by a diffusion anneal at temperatures ranging from between 150° C.-900° C. The diffusion anneal can be either a static anneal in a bell furnace or a dynamic anneal with a wire traveling through an elongated furnace under precisely controlled heat treatment profiles. Typically, the furnace atmosphere is air or an air/nitrogen mixture such that only minimal oxidation occurs. All of the current state of the art γ-brass alloy constructions result in a single phase, binary Cu/Zn alloy γ-brass coating because the synthesis reaction is a quasi-equilibrium diffusion anneal. This, in turn, results in a typical equilibrium composition of 62-65% Zn as predicted by equilibrium binary Cu—Zn phase diagrams such as the one Hansen published in 1958 in the reference Constitution of Binary Alloys.

Existing coated EDM wire electrode constructions includes teachings of thin oxide surface layers. Brifford et al. (U.S. Pat. No. 4,341,939) proposed the original oxide surface layer construction for an unalloyed zinc coating on a brass substrate where the superficial thin oxide film had a thickness configured to display semi-conductor electrical characteristics, which prevented short circuits in the discharge process. Subsequently when Brifford (U.S. Pat. No. 4,977,303) proposed a single phase beta (β) brass alloy coating on a copper core, the wire also included a zinc oxide surface coating whose thickness was estimated to be about 1 μm. The subsequent products resulting from that technology were commercially known as Cobracut X and Cobracut D and became industry standards which are still in use today.

More recently, double layer discontinuous γ-brass alloy outer layers on semi-continuous or continuous β-brass alloy intermediate layered constructions have been proposed (see Gross et al. (U.S. Pat. No. 6,781,081), Shin (U.S. Pat. No. 7,723,635), Baumann et al. (U.S. Pat. No. 8,853,587), and Blanc et al. (U.S. Pat. No. 8,378,247)). In these constructions, a thin (approximately 1 μm) outermost zinc oxide layer coats the EDM wire to act as a semi-conductive barrier that prevents short circuits as originally proposed by Brifford et al.

At this point in EDM technology evolution, the state of the art γ-brass coated wire electrode technology has been most completely described by Blanc et al., which identified a double layered γ/β coating and an analytical technique (Selective Dissolution Test) for precisely measuring the thickness of the preferred semi-conductive zinc oxide barrier layer, e.g., 100 nm-250 nm. Additionally, Yen (US 2016/0039027) has suggested that thicker (>1 μm) zinc oxide outer layers can enhance EDM wire performance by taking advantage of the reverse piezoelectric effect that is available in the EDM application.

SUMMARY

In one example, an electrode wire for use in an electrical discharge machining apparatus includes a metallic core and a layer of gamma phase brass disposed over the metallic core. Particles of beta phase brass are interspersed within the gamma phase brass layer. An oxide layer including zinc is disposed over the gamma phase brass layer.

In another example, a method of forming an electrode wire for use in an electrical discharge machining apparatus includes coating a layer including zinc onto a metallic core to form a composite wire. The composite wire is heat treated in an enriched oxygen environment to form a layer of gamma phase brass over the core that includes particles of beta phase brass precipitated from the gamma phase layer. The composite wire is drawn down to a finish diameter.

The present invention is based on the surprising finding that zinc oxide layers thicker than 1 μm on EDM wire can provide advantageous properties when heat treated in enriched oxygen environments. More specifically, such a zinc oxide layer positioned over a single phase γ-brass alloy layer will preferentially consume zinc from the single phase γ-brass alloy phase field in response to prolonged exposure to an enriched oxygen environment at a low temperature. Ultimately, the local zinc content in the γ-brass phase field will be randomly reduced until the local zinc concentration falls below the limit of γ-brass alloy existence. As a result, the local precipitation of β-phase brass alloy particles occurs within the γ-brass alloy layer.

If the as constructed γ-brass alloy is subsequently deformed in a wire drawing process (as is typically the case to attain the desired tensile strength and desired wire diameter) all γ-brass alloy elements in the wire will be fractured and embedded in the surface of an underlying core due to the extreme brittleness of the alloy. In the case of γ/β double layer constructions, the resultant microstructure is characterized as single phase γ-brass alloy particles embedded in a semi-continuous or continuous β-phase brass alloy layer which, in turn, overlies the core. The β-phase brass layer is extruded into discontinuities between and adjacent to the γ-phase brass layer, but not contained within those particles, in such a double layer construction.

The location of the β-phase brass layer has metallurgical significance. In the evolution of these double layered γ/β constructions, it was recognized that a β-phase layer beneath a γ-phase layer is often metallurgically bonded to the γ-phase layer. This particular bonding improves the adherence of the γ particles that have been internally fractured. Furthermore, the position of the β-phase layer between the γ-phase layer particles typically offers a more efficient flushing surface than the core wire alloy, which otherwise would occupy that space.

The fact that in the present invention the predominately γ-phase layer also contains randomly dispersed, isolated β-phase brass precipitates is important because of the potential influence those precipitates can have on the fracture mechanics of the γ-phase layer into discrete particulate if they are deformed by subsequent wire drawing. The β-phase brass precipitates can also influence any discharge events occurring at the γ-phase layer interface with the workpiece during the EDM machining process.

Other objects and advantages and a fuller understanding of the invention will be had from the following detailed description and the accompanying drawings.

DETAILED DESCRIPTION

The present invention relates to electrode wires used for fabricating metal or electrically conducting parts by EDM using an EDM machine tool, and specifically to a process for manufacturing high performance EDM electrode wire utilizing gamma phase brass coatings and an EDM wire produced from the process.

Figure 1A:
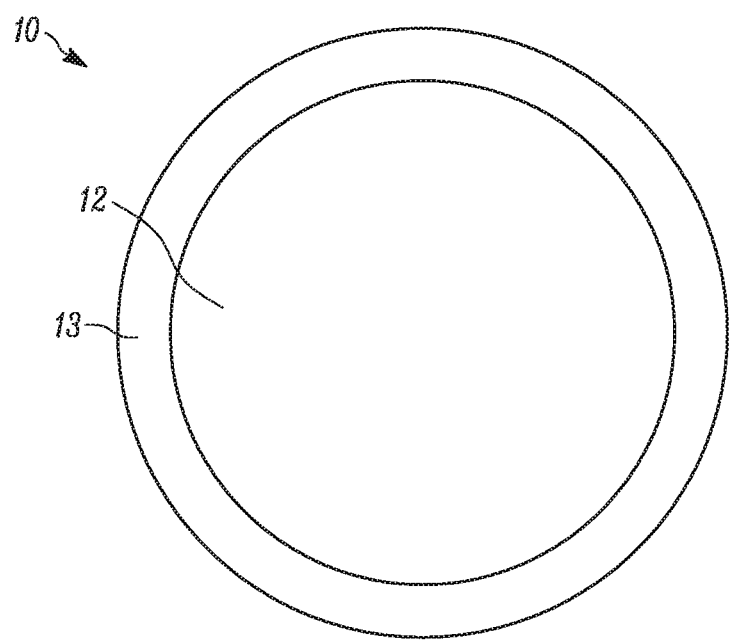
FIGS. 1A-1E are schematic illustrations of various stages of forming an EDM wire in accordance with an embodiment of the present invention.

FIGS. 1A-1E illustrate an example wire electrode or EDM wire 10 in accordance with an aspect of the invention. Referring to FIG. 1A, the EDM wire 10 includes a core 12 formed from a metal and/or metal alloy including, for example, copper, a copper zinc alloy, copper clad steel or aluminum clad steel. The core 12 can have a diameter of about 0.8 to 2.0 mm.

A layer 13 of a second metal having a heat of vaporization less than 35 KJ/cm3, e.g., zinc, is coated over the core 12. It will be appreciated, however, that the layer 13 can include additional materials in addition to zinc, such as copper. The layer 14 can be coated on the core 12 in any known manner, such as by electroplating. The layer 13 has a thickness of about 10-12 μm and cooperates with the core 12 to form a composite wire 10.

Figure 1B:
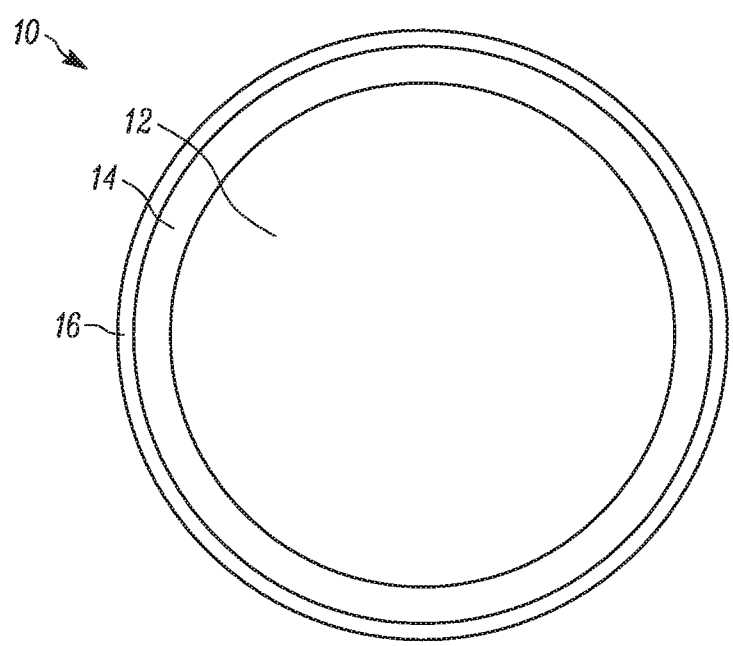
Figure 1C:
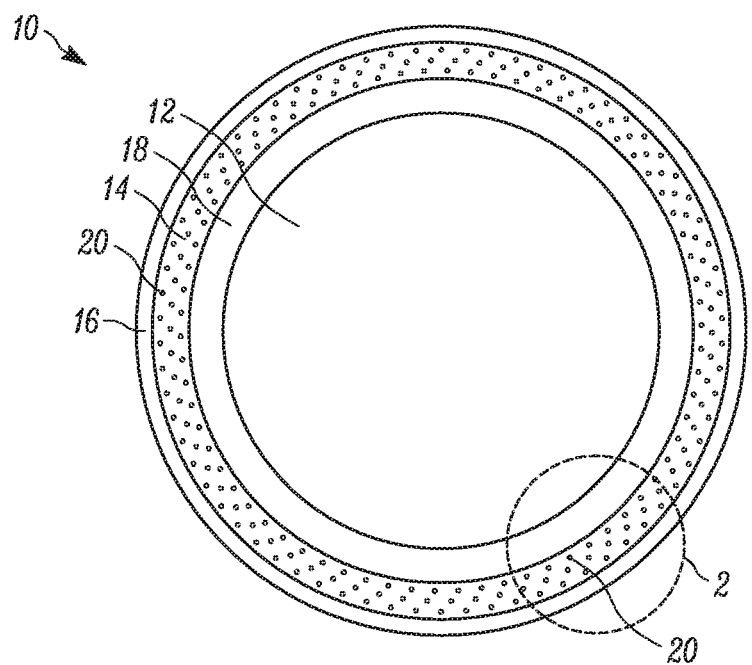
Figure 1D:
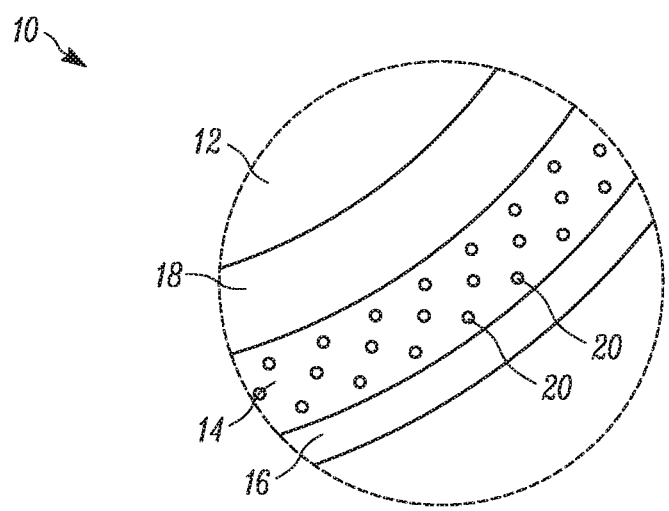

The composite wire 10 is heated by diffusion annealing, which causes a portion of the layer 13 to be transformed into a brass alloy, such as γ-phase brass, forming a coating layer 14 (see FIG. 1B). In one example, heat treating a core 12 including copper causes the copper to diffuse outwardly into the layer 13, thereby sequentially transforming zinc into a γ-phase brass alloy. The γ-phase brass layer 14 can have a substantially homogenous composition and thickness. In one example, the diffusion annealing can be performed at about 150° C.-160° C. for about 24 hours. The diffusion annealing is performed in an oxygen enriched environment, i.e., in an environment composed of greater than 22% oxygen, causing the outer portion of the layer 13 to oxidize into a thin, zinc oxide layer 16 defining the exterior of the coated wire 10. The zinc oxide layer 16 has a thickness of at least 1 μm. Depending on the extent and/or duration of the heat treatment, a portion of the γ-phase layer 14 adjacent the core 12 can receive additional copper from the core, which transforms the portion into a layer of β-phase brass 18 (see FIGS. 1C-1D).

After the first round of heat treatment, the coated wire 10 can be diffusion annealed again, but this time at a greater temperature and shorter duration than the first round. In one example, the second round of diffusion annealing can be performed at about 275° C. for about 6 hours in an enriched oxygen environment. During the heat treatment, the zinc oxide layer 16 continues to preferentially consume zinc from the underlying γ-phase layer 14 due to reaction kinetics, thereby reducing the zinc content locally within the γ-phase layer at random locations until the local zinc concentration is below the limit for γ-phase existence at these locations. As a result, local precipitation of β-phase particles 20 occurs within the γ-phase layer 14. The β-phase particles 20 are therefore dispersed within the γ-phase layer 14 and can be completely surrounded or enclosed by the γ-phase layer.

Figure 1E:
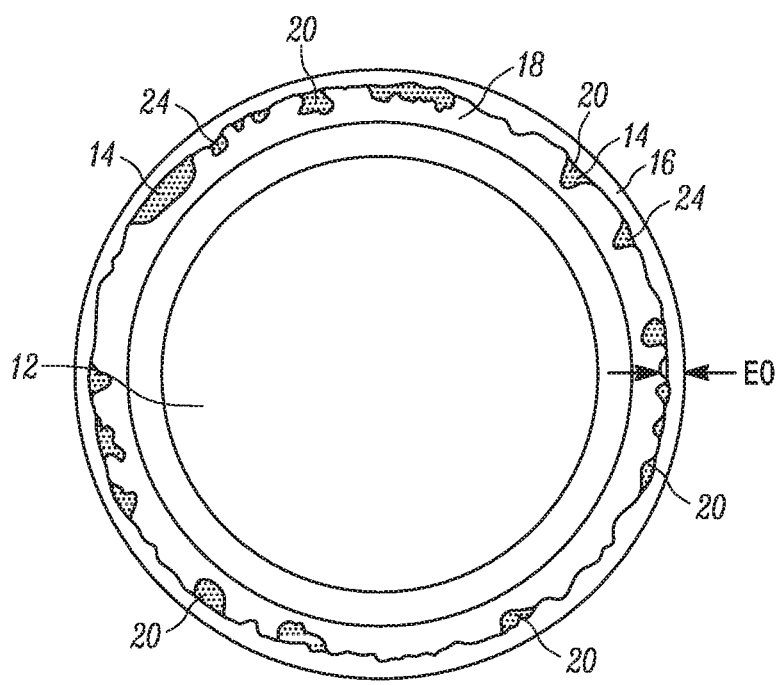

Next, the coated wire 10 undergoes a cold drawing process, which deforms the coated wire to attain a desired tensile strength and finish diameter. During the drawing step, the γ-phase layer 14 is redistributed over the circumference of the wire 10, as shown in FIG. 1E. The γ-phase layer 14 is completely brittle and therefore cracks when elongated by the drawing step. As a result, a series of discontinuities or gaps 24 are formed in the layer 14 during drawing. The gaps 24 extend radially inward such that portions of the core and/or β-phase layer 18 are exposed to ambient conditions through the γ-phase layer 14.

At the same time, some of the brittle γ-phase brass particles forming the layer 14 become fractured and embed themselves in the surface of the underlying β-phase layer 18, thereby producing a convoluted topography along the γ-phase layer/β-phase layer interface. Such a configuration can create hydraulic turbulence at the wire 10 surface, thereby enhancing the flushing action of the dielectric.

It is clear from the foregoing that several physical changes occur when the wire 10 is heat treated in an enriched oxygen environment. First, the zinc layer 13 is progressively transformed into a zinc oxide layer 16 and a γ-phase 14 layer and, if desired, an additional β-phase layer 18 radially between the core 12 and the γ-phase layer. Second, the γ-phase 14 layer becomes metallurgically bonded to the layer beneath it, i.e., either the core 12 or the β-phase layer 18, thereby improving adherence between the γ-phase layer and the layer beneath it. Third, the zinc layer 13 continues to form the zinc oxide layer 16 and cannibalizes zinc from the γ-phase layer 14 until β-phase brass particles 20 precipitate out of the γ-phase layer at random locations.

It is also clear from the above that several physical changes occur in the wire 10 during drawing. First, the brittle γ-phase layer 14 fractures and becomes redistributed over the circumference of the wire 10, forming discontinuities or cracks 24 therein. These discontinuities 24 are at least partially filled with portions of the β-phase layer 18, which is extruded outward in the drawing step due to its high ductility. As a result, the β-phase layer 18 is extruded radially outward into the discontinuities 24 to thereby offer a more efficient flushing surface than the core wire 12, which would occupy that space but for the presence of the β-phase layer. Portions of the zinc oxide layer 16 can also extend into the discontinuities 24 following cold drawing. Moreover, the β-phase brass particles 20 can advantageously affect the fracture mechanics of the wire 10 when they are deformed by wire drawing.

Example

Figure 2:
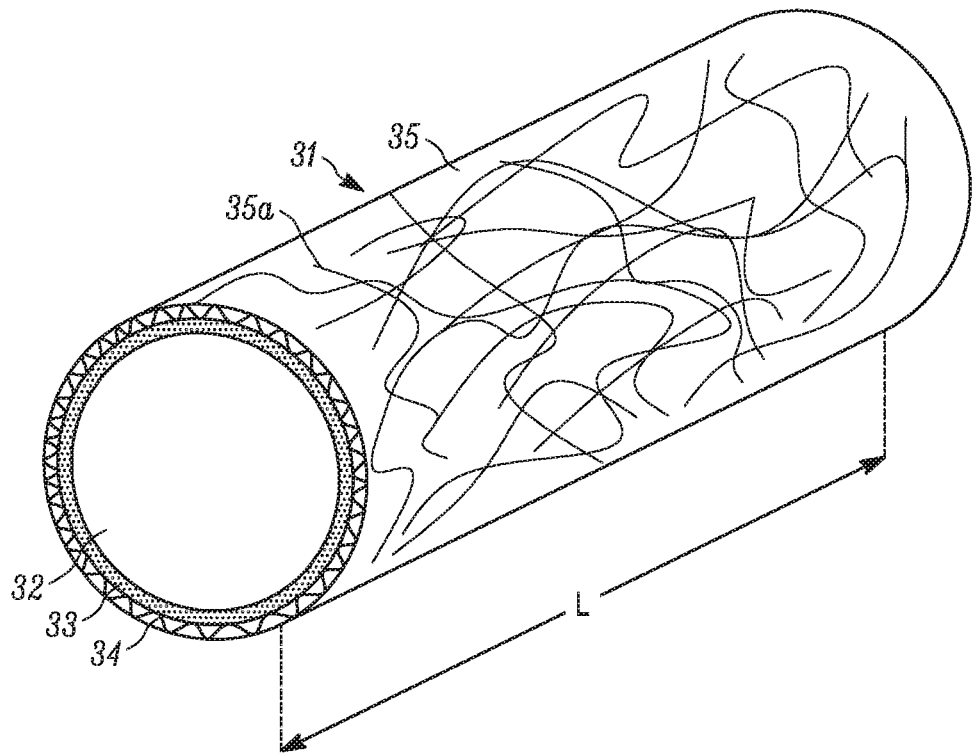
FIG. 2 is a schematic illustration of an EDM wire according to the prior art.
Figure 3:
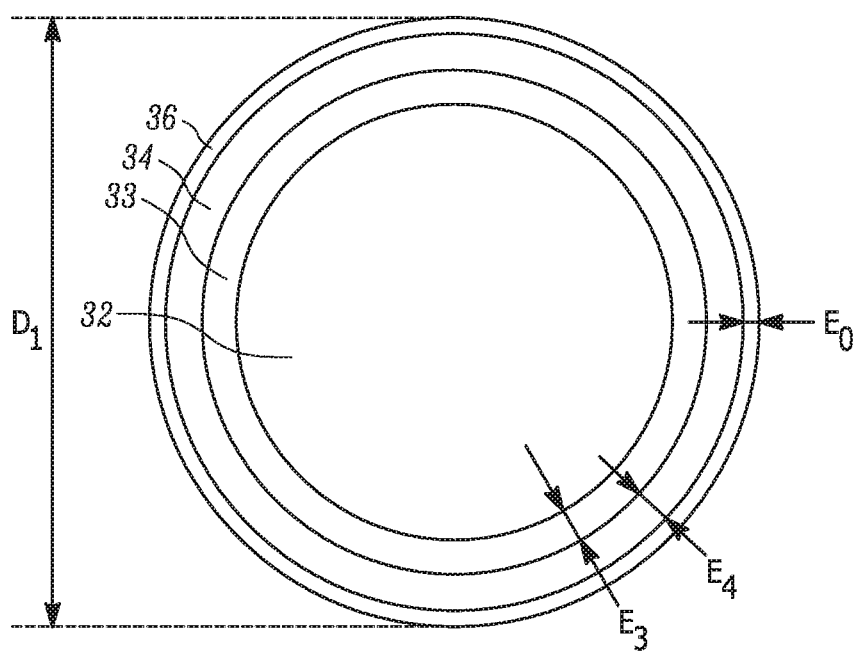
FIG. 3 is an end view of the prior art EDM wire of FIG. 2.

A sample (HTCLN) of the EDM wire of the present invention was compared to a sample (SD2) reproduced from the description in Blanc et al. (U.S. Pat. No. 8,378,247). Referring to FIGS. 2-3, the SD2 sample wire 31 included a γ/β double layer construction containing a core 32 made of 63Cu/37Zn overlaid with a continuous β-brass sublayer 33 coating having a thickness $E_3$. A surface layer 34 overlays the sublayer 33 and has a thickness $E_4$. The surface layer 34 includes a fractured γ-brass structure 35a revealing β-brass in the fractures. A γ-phase region 35 of the surface layer 35 is bordered by the fractures 35a in the surface layer. β-brass may at least partially fill the fractures 35a in the γ-brass surface layer 34, giving the surface of the wire 31 a certain degree of continuity. An oxide layer 36 overlies the surface layer 34 and has a calculated thickness $E_0$. The SD2 wire sample 31 has a diameter $D_1$ of 0.25 mm.

In order to compare the present invention to the current state of the art of γ-brass coated wire electrode technology, it was appropriate to establish a characterization of the metallurgical structure and performance of current γ-brass coated constructions, e.g., the SD2 sample.

Figure 4:
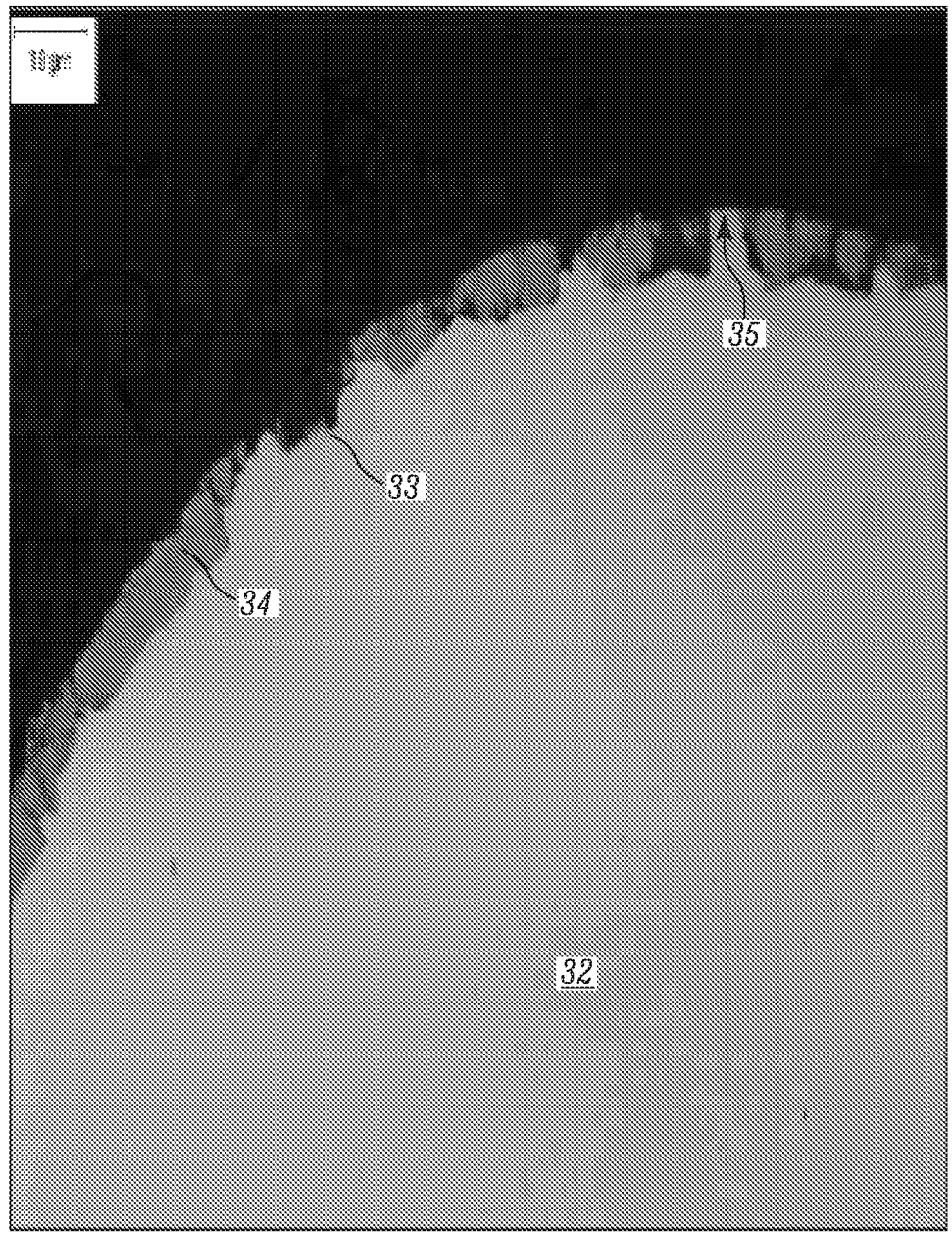
FIG. 4 is a metallographic cross-section of the prior art EDM wire of FIG. 2.
Figure 5:
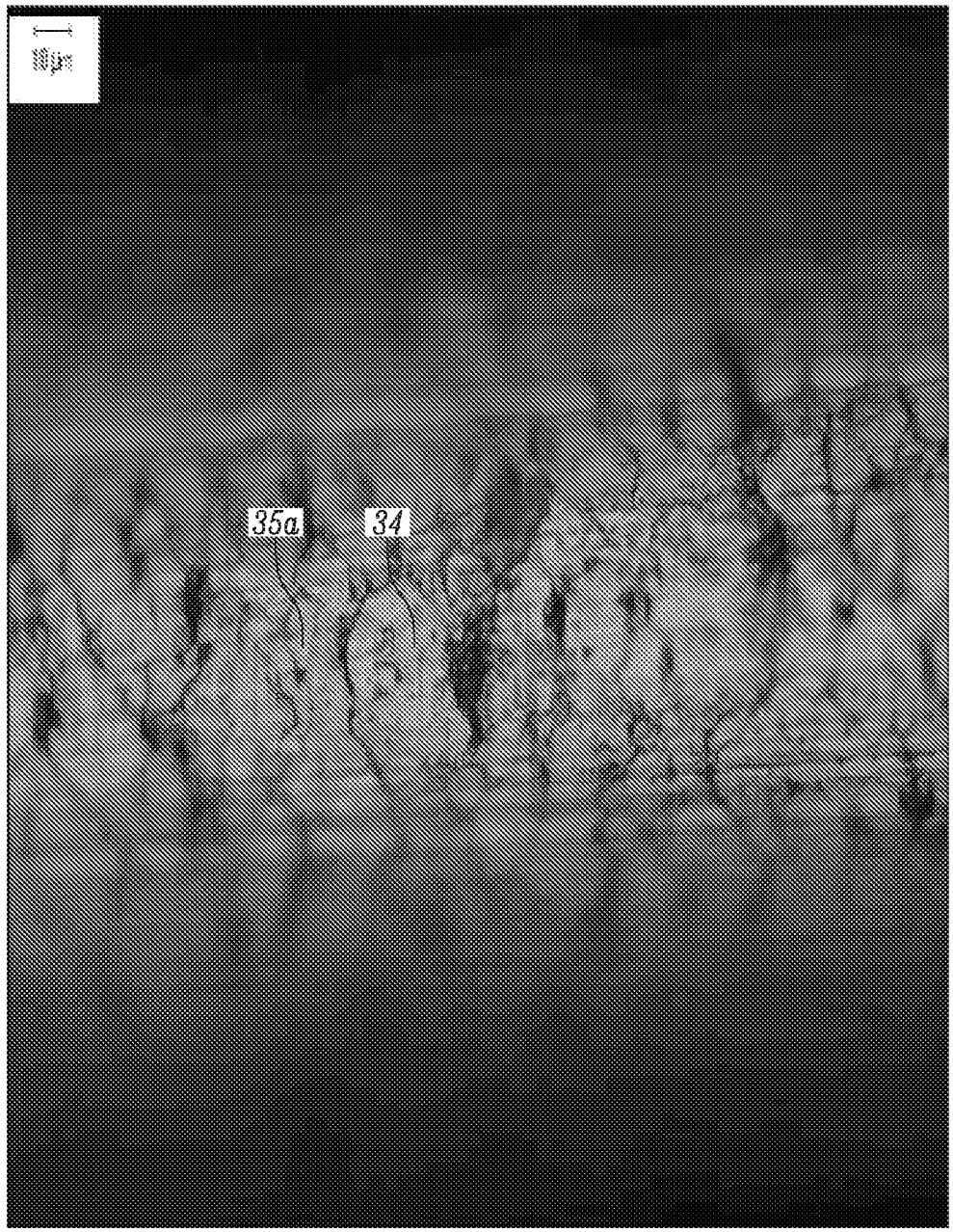
FIG. 5 is an optical photomicrograph of the surface of the prior art EDM wire of FIG. 2 at a diameter of 0.25 mm.

That said, FIG. 4 is a lightly etched metallurgical optical cross-section at high magnification of the SD2 sample. FIG. 5 is an optical photomicrograph at high magnification of the surface topography of the SD2 sample. A Selective Dissolution Test as prescribed by Blanc et al. was performed on the sample SD2, with the result being that the oxide layer 36 had a calculated thickness $E_o$=191 nm (see FIG. 3). This value was consistent with the Blanc et al. preferred result of 100 nm-250 nm.

The sample HTCLN was prepared according to the present invention using the process schedule detailed as follows:

Stage 1. Electroplate 10-12 µm zinc on 1.2 mm diameter 60Cu/40Zn core wire

Stage 2. Heat Treat at 155° C. for 24 hrs in an oxygen atmosphere

Stage 3. Raise Heat Treat temperature to 275° C. and continue for additional 6 hrs Stage 4. Pickle in concentrated $H_2SO_4$ solution (10%-15% $H_2SO_4$/pH=1-2)

Stage 5. Draw to finish diameter of 0.25 mm

The strategy employed in processing the sample HTCLN was to create a sample with a heat treatment known to produce a microstructure similar in elements and dimensions to the sample SD2 while removing any potential excess oxides introduced by the heat treatment responsible for the unique microstructure being evaluated. To this end, pickling the coated wire in Stage 4 removed excessive oxide from the HTCLN sample for purposes for testing the HTCLN sample against the SD2 sample. In use, however, the oxides would not be removed from the coated wire.

As a result, both the SD2 and HTCLN samples were intended to have comparable microstructures except for their γ-phase layer structures, i.e., the presence of β-phase particle precipitates within the γ-phase layer in the sample HTCLN versus the absence of such particles within the γ-phase layer in the sample SD2. This was done for the purpose of establishing that the unique microstructure of the present invention is responsible for the improved performance over the prior art.

Figure 6:
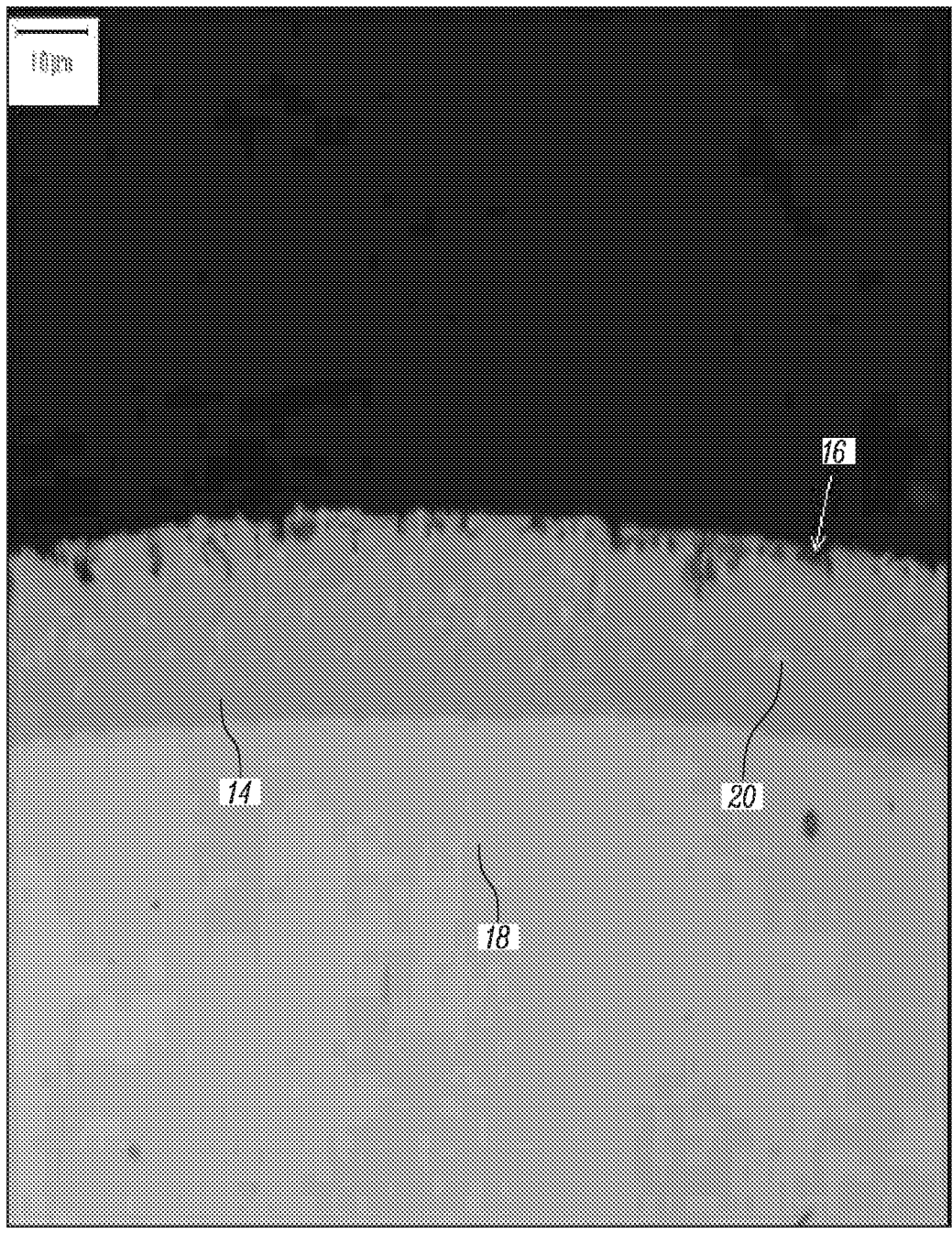
FIG. 6 is a metallographic cross-section of an EDM wire according to the present invention at a diameter of 1.2 mm.

FIG. 6 is a photograph of an as polished metallurgical optical cross-section at high magnification of the sample HTCLN at the conclusion of Stage 3. The photograph clearly indicated the presence of β-phase particle 20 precipitates within the γ-phase layer 14 at the intermediate diameter of 1.2 mm prior to wire drawing. This and similar cross-sections of the HTCLN sample following Stage 3 were analyzed with Paxit™ Image Analysis Software and found to average 6.4% aerial content of β-phase particle 20 precipitates, which were previously identified as β-phase particles by EDS analysis on a scanning electron microscope (SEM).

A modified Selective Dissolution Test was performed on the HTCLN sample at the conclusion of Stage 3 where the wire diameter was 1.2 mm. A 120 minute dissolution time was used when performing the tests on the HTCLN sample due to the larger diameter of the HTCLN sample compared to the 0.25 mm diameter SD2 sample. Using this modified test, at the conclusion of Stage 3, the $E_o$ for the HTCLN sample was calculated to be 227 nm. At the conclusion of Stage 4, the $E_o$ was calculated to be 95 nm, which is a significant drop from the as heat treated value.

Figure 7:
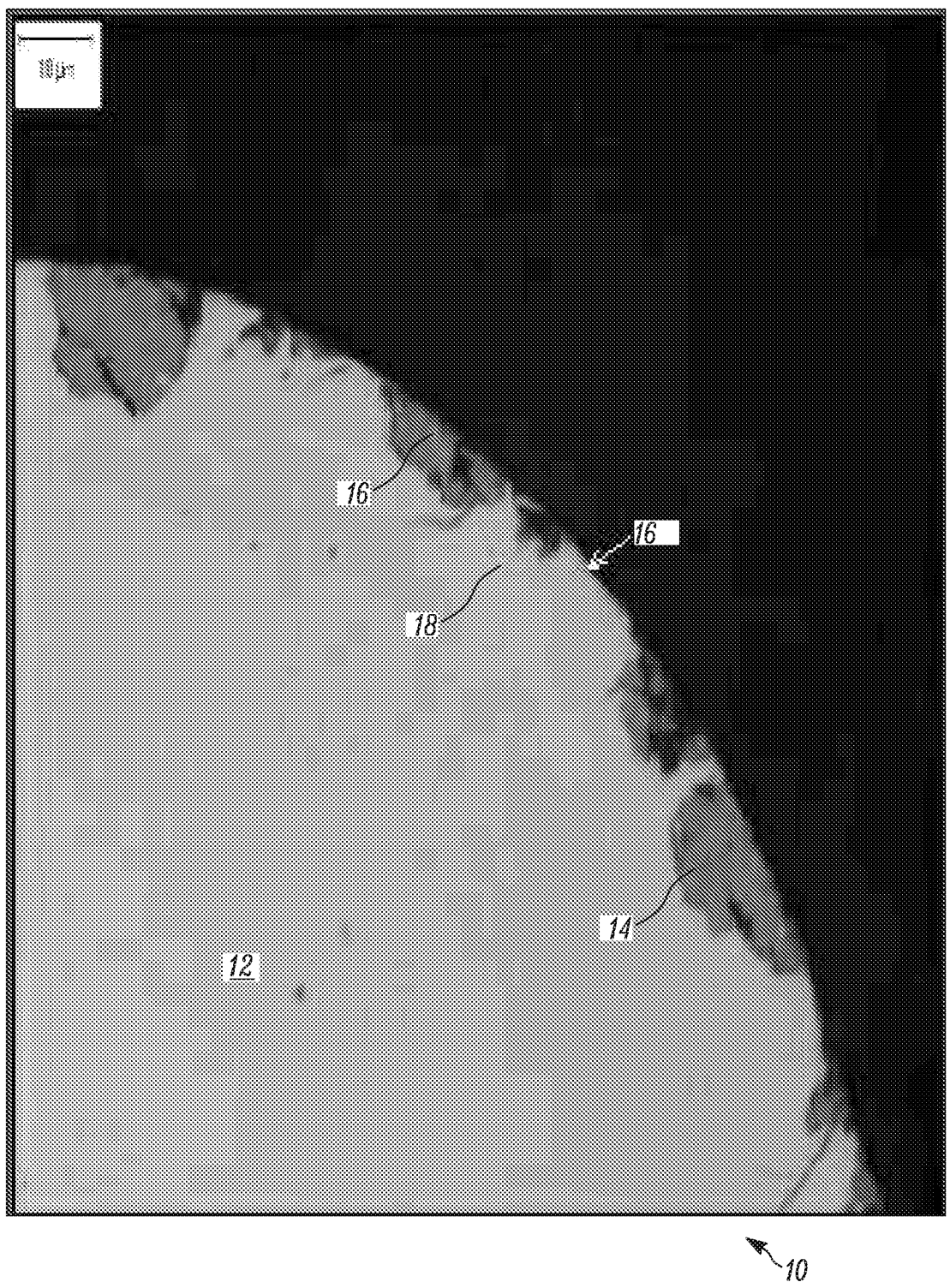
FIG. 7 is a metallographic cross-section of an EDM wire according to the present invention at a diameter of 0.25 mm.

FIG. 7 is a lightly etched metallurgical optical cross-section at high magnification of the HTCLN sample at the conclusion of Stage 5. The β-phase particle 20 precipitates are clearly shown dispersed within the γ-phase layer 14. It is also clear that the continuous γ-phase layer 14 synthesized during the heat treatment fractured into a discrete but discontinuous layer having a series of cracks or discontinuities 24 extending radially inward towards the core 12. At the same time, the β-phase layer 18 also redistributed around the circumference of the wire 10 circumference but remained a continuous layer due to its greater ductility. To this end, the β-phase layer 18 was extruded radially outward into the discontinuities 24 in and between portions of the γ-phase layer 14. Portions of the zinc oxide layer 16 also extended into the discontinuities 24.

Figure 8:
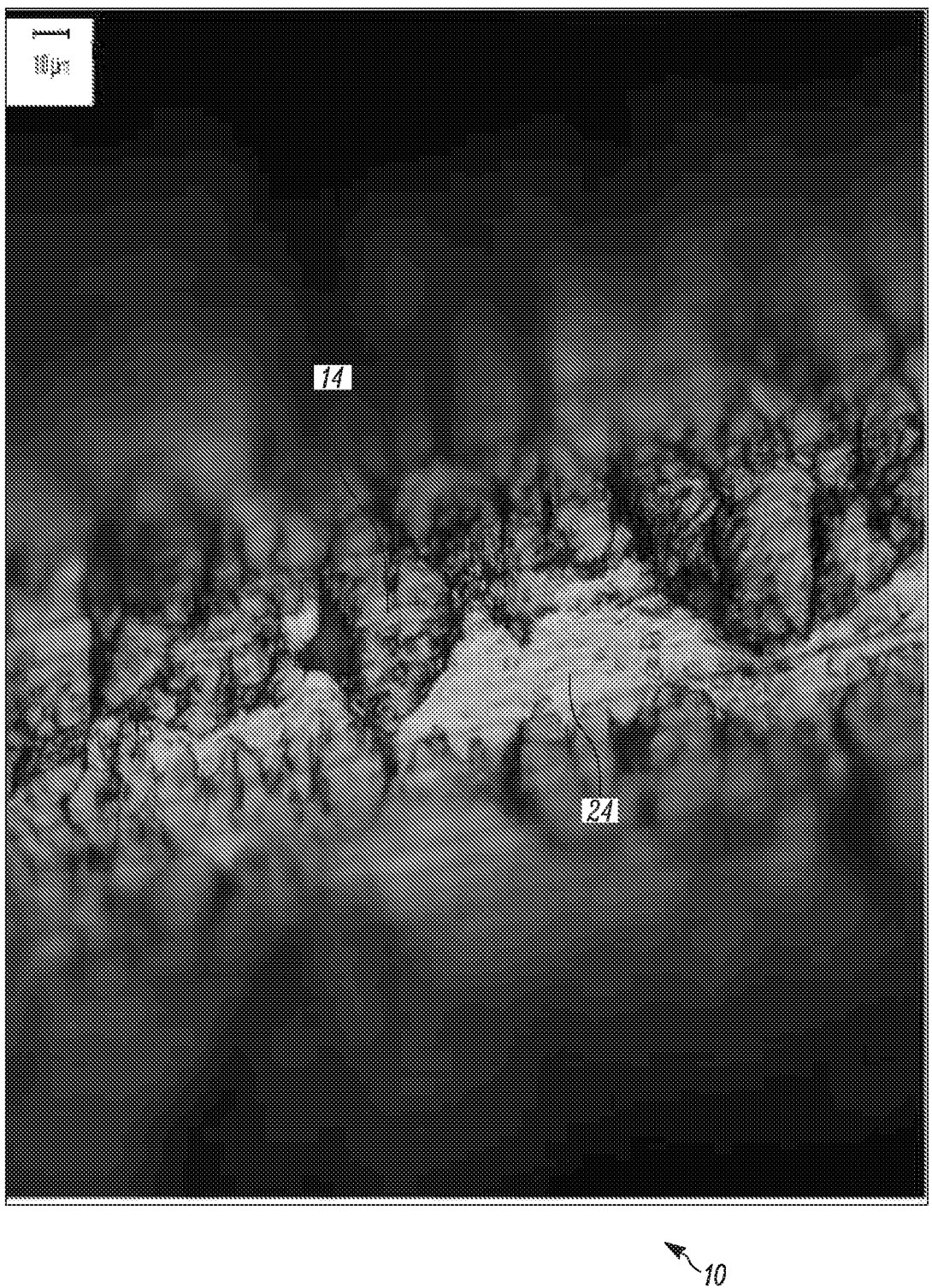
FIG. 8 is an optical photomicrograph of the surface of the EDM wire of FIG. 6.

FIG. 8 is an optical photomicrograph at high magnification of the surface topography of the HTCLN sample, which is similar in topography to the SD2 sample. The photomicrograph also illustrates the same surface continuity evidenced in the SD2 sample. A Selective Dissolution Test as prescribed by Blanc et al. was performed on a sample of HTCLN at the finish diameter of 0.25 mm with the result that $E_o$=84 nm.

Analysis

Considering the above characterizations of the SD2 and HTCLN samples, a comparison of the two constructions is summarized in the table below:

|  | Wire Construction SD2 | Wire Construction HTCLN |
|---|---|---|
| Nominal γ-layer $E_4$ Thickness | 3-7 µm | 5-10 µm |
| Structure of γ-layer | Single Phase Field of γ-brass | Two Phase Field of γ-brass + β-brass Precipitates |

|  | Wire Construction SD2 | Wire Construction HTCLN |
|---|---|---|
| Nominal β-layer $E_3$ Thickness | 5-12 μm | 4-10 μm |
| Location of β-phase | Beneath γ-particles + Filling Fractures of γ-particles | Same as SD2 + Precipitated within γ-particles |
| Double Layer Thickness | 10-15 μm | 12-15 μm |
| Calculated Value of $E_0$ | 191 nm | 84 nm |

Estimating the exact thickness values for $E_3$ and $E_4$ was difficult due to 1) fracturing of the γ-phase layer into irregularly shaped particles and groups thereof during drawing, and 2) because the β-phase layer also redistributes itself during drawing. However, estimating the double layer thickness ($E_3+E_4$) can be more readily and accurately achieved since it can be defined by the outside diameter of the wire and the inner diameter of the β-phase layer.

With these limitations and the structural similarities between the samples SD2 and HTCLN in mind, it is reasonable to conclude that the HTCLN sample has metallurgically significant differences in microstructures from the SD2 sample due to the presence of the β-phase particles precipitated out from the γ-phase layer in the HTCLN sample.

Figure 9:
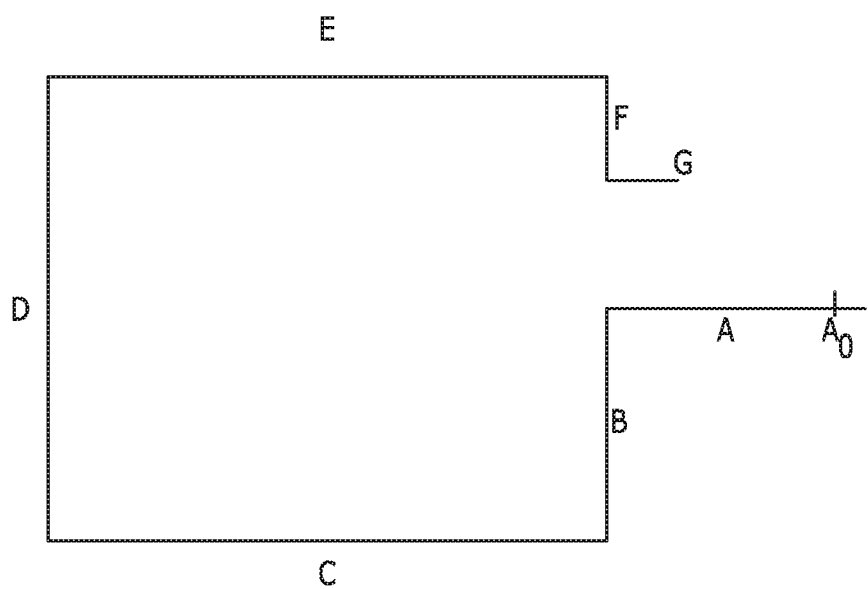
FIG. 9 is a sketch of a test cut performed to compare the EDM wire of FIG. 1 with the prior art EDM wire of FIG. 2.

In order to quantify the performance of the SD2 and HTCLN samples, test cuts of a simulated punch were performed on a Model 650 G plus Excetek EDM wire machine tool. The work piece consisted of a 2.0 inch thick plate of hardened ($R_c$ of between 52-56) D2 tool steel surface ground on the top and bottom to create sealed flushing conditions. The geometry of the test cut is illustrated in FIG. 9. The lengths of segments are:

$A_0$=0.025 inch
A=0.200 inch
B=0.200 inch
C=0.400 inch
D=0.400 inch
E=0.400 inch
F=0.100 inch
G=0.025 inch The test cut included a timed roughing pass followed by two timed skim cuts performed in sequence. Each pass was initiated at an edge of the plate. The test cuts were spaced out on the plate so that at no time was an edge or cutting path within 0.200 inches of a previous kerf to guarantee the integrity of flushing conditions. Initially multiple cycles of the roughing pass were conducted to establish the most aggressive machine technology that each of the wire constructions could sustain through the complete cycle from A to G without any wire breaks. The Brass Machine Technology provided by the manufacturer was used as a starting point and adjustments made to it until wire breaks occurred. The Excetek machine technology parameters available to the operator are listed below with a brief explanation of their function where appropriate:

| Parameter | Range | Comment |
|---|---|---|
| PM (Power) | 1-10 | |
| OV (Open Voltage) | 1-20 | |
| ON | 0-24 | |
| OFF | 4-50 | |
| AN (arc on) | 1-16 | |
| AFF (arc off) | 4-50 | |
| SV (Servo Voltage) | 16 V-90 V | |
| WT (Wire Tension) | 1-20 | 10 = 1,200 gms |
| WF (Wire Feed) | 1-20 | 2-21 m/min |
| WA ($H_2O$ Pressure) | 1-8 | 8 = 250 psi |
| FR % | 1-500 | |
| F (Feed Rate) | 0-4 | in/min |
| FT (Servo Mode) | | G95 = servo mode G94 = manual mo |
| SC (Servo Control) | 1-99 | |

The machine technologies available and those employed for test cuts of the two SD2 samples and one HTCLN sample are listed in the table below:

|  | Brass | Rough Cuts SD2* | SD2 | HTCLN | Skim 1 | Skim 2 |
|---|---|---|---|---|---|---|
| PM | 10 | 10 | 10 | 10 | 10 | 6 |
| OV | 8 | 9 | 8 | 10 | 14 | 12 |
| ON | 15 | 15 | 15 | 16 | 3 | 2 |
| OFF | 8 | 8 | 8 | 8 | 11 | 10 |
| AN | 8 | 8 | 8 | 8 | 2 | 2 |
| AFF | 8 | 8 | 8 | 8 | 11 | 10 |
| SV | 38 | 43 | 38 | 38 | 38 | 45 |
| WT | 10 | 10 | 10 | 10 | 13 | 15 |
| WF | 7 | 7 | 7 | 7 | 7 | 7 |
| WA | 8 | 8 | 8 | 8 | 1 | 1 |
| FR % | 100 | 100 | 100 | 100 | 100 | 100 |
| F | 0.150 | 0.150 | 0.150 | 0.150 | 0.236 | 0.394 |
| FT | G95 | G95 | G95 | G95 | G95 | G95 |
| SC | 10 | 12 | 12 | 14 | 18 | 20 |
| Offset | 0.008 | 0.008 | 0.008 | 0.008 | 0.0056 | 0.0052 |

In summary the HTCLN sample demonstrated a toughness that allowed it to sustain a more aggressive machine tool technology than the SD2 sample. The parameters most effective at influencing wire performance are identified by underlining. The technology SD2* came the closest of the SD technologies to the HTCLN technology but the test cut with the SD2* technology resulted in five wire breaks in traveling from segments A to G. The same skim technologies 1 and 2 and offsets for all rough cuts and skim passes were used on both Sample SD2 and Sample HTCLN.

The results of the test cuts are summarized in the table below:

|  | SD2 | HTCLN |
|---|---|---|
| Rough Cut Time (hrs:mins:sec) | 0:17:49 | 0:15:29 |
| Skim 1 Time | 0:7:34 | 0:7:34 |
| Skim 2 Time | 0:4:14 | 0:4:14 |
| Calculated Rough Cut Feed Rate (in/min) | 0.1025 | 0.1179 |
| Surface Finish (Ra µm) | 0.795 | 0.825 |

The machine tool timed the rough cut starting at the beginning of segment $A_0$ through the conclusion of segment G where segment $A_0$ includes a transition where ideal flushing conditions and the servo equilibrium are being established, but the short span of these non-equilibrium conditions has minimal effects on any conclusions drawn from the timing data.

The completed test punches from the test were checked for dimensional stability and both punches were accurate to within a tenth of one mil. The surface finishes of both samples also were acceptably close as measured on a Mitutoyo SJ-410 surface roughness tester. The calculated feed rate (cut length divided by cycle time) of the HTCLN sample was determined to be about 15% faster than that of the SD2 sample. This is clear evidence that the unique microstructure of the HTCLN sample, namely, the presence of β-phase particle precipitates within the γ-phase layer, allowed the HTCLN sample to exhibit improved performance over state of the art EDM wires.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

For example, it will be appreciated that the EDM wire formed according to the present invention can include only the γ-phase layer or both the γ-phase layer and β-phase layer—both constructions including precipitated β-phase particles dispersed/isolated within the γ-phase layer. In the former construction, the discontinuities can extend to the core to expose the core. In the latter construction, the discontinuities expose the β-phase layer.

What is claimed is:

1. An electrode wire for use in an electrical discharge machining apparatus, comprising:
   a metallic core;
   a layer of gamma phase brass disposed over the metallic core;
   a layer of beta phase brass between the core and the gamma phase brass layer;
   particles of beta phase brass separate from the layer of beta phase brass and interspersed within the gamma phase brass layer;
   and an oxide layer including zinc disposed over the gamma phase brass layer.

2. The electrode wire of claim 1, wherein the beta phase brass layer is continuous.

3. The electrode wire of claim 1, wherein a combined thickness of the gamma and beta phase brass layers is about 12 to 15 µm.

4. The electrode wire of claim 1, wherein the gamma phase brass layer is discontinuous so as to expose the beta phase brass layer.

5. The electrode wire of claim 1, wherein the gamma phase brass layer is discontinuous.

6. The electrode wire of claim 5, wherein portions of the zinc oxide layer also extend into the discontinuities of the gamma phase layer.

7. The electrode wire of claim 1, wherein the zinc oxide layer has a thickness of about 84 nm.

8. The electrode wire of claim 1, wherein the core comprises at least one of copper, a copper zinc alloy, copper clad steel, aluminum clad steel, and a metal and a metal alloy.

* * * * *